United States Patent [19]
Welch

[11] Patent Number: 5,860,245
[45] Date of Patent: Jan. 19, 1999

[54] VEGETABLE GROWING MAT

[76] Inventor: Robin Lee Welch, 1001 Road 44, Pasco, Wash. 99301

[21] Appl. No.: 914,501

[22] Filed: Aug. 19, 1997

[51] Int. Cl.$^6$ .................................................. A01C 1/04
[52] U.S. Cl. ................................................................ 47/56
[58] Field of Search ........................... 47/56, 9, 74, 1.01, 47/901

[56] References Cited

U.S. PATENT DOCUMENTS

| | | | |
|---|---|---|---|
| 4,190,981 | 3/1980 | Muldner | 47/56 |
| 4,414,776 | 11/1983 | Ball | 47/56 |
| 4,941,282 | 7/1990 | Milstein | 47/58 |
| 5,421,123 | 6/1995 | Sakate et al. | 47/56 |
| 5,490,351 | 2/1996 | Molnar et al. | 47/56 |
| 5,507,845 | 4/1996 | Molnar et al. | 47/1.01 |

*Primary Examiner*—J. Woodrow Eldred

[57] ABSTRACT

A sterilized laminated mat for growing vegetation comprising a biodegradable base fabric, a plurality of seeds adhered to the base fabric, a sterilized hydrating medium secured to the base fabric, and a cover fabric secured to the hydrating medium to maintain structural integrity of the device. The device may also comprise fertilizer added as discrete units, or as a uniform layer, to the base fabric or incorporated into the hydrating medium. The seeds, hydrating medium and cover fabric are all secured with biodegradable, water soluble organic adhesives. Preferably, all components of the device are sterilized, with the exception of the seeds if such sterilization would have deleterious effects on germination.

4 Claims, 2 Drawing Sheets

VEGETABLE GROWING MAT

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

This invention relates to a novel vegetable growing mat particularly adapted for growing herbs, vegetables, flowers, mushrooms and the like. As used herein, "vegetable" refers to the generic term applied to vegetation grown for consumption as food or medicine, for ornamental display, or for any other known purpose, and includes, inter alia, mushrooms. The novel mat requires no thinning and is weed, insect and disease resistant.

Vegetation mats are well known in the art. Mats have been prepared having food vegetable seeds, flower seeds, and the like incorporated into a mulch and fertilizer substrate to provide "ready-made" flower or food gardens. Such devices may incorporate herbicides or weed barriers. For example, U.S. Pat. No. 4,414,776 to Ball discloses a seed layer applied to a paper backing, and U.S. Pat. No. 4,941,282 to Milstein discloses a laminated member for propagation of sod.

Therefore, while it is known to incorporate vegetable seeds into a structure having a growing medium, fertilizer, etc. there is a need for a vegetable mat having the capability of permitting downward growth of desired plants while preventing upward growth of undesired plants from beneath the mat.

BRIEF SUMMARY OF THE INVENTION

The invention comprises a new and improved laminated vegetable-growing mat having a sterile biodegradable or non-biodegradable membrane which may be penetrated by roots of plants growing from above, while being essentially impenetrable from the shoots of plants germinated from below the membrane. In a preferred embodiment, the mat comprises a base fabric membrane upon which are deposited a plurality of plant seeds and fertilizer, a hydrating medium, and a cover medium.

The base fabric medium is preferably any water-permeable, light-impermeable fabric capable of permitting roots from desirable plants growing from seeds implanted on the fabric to grow downwardly through the fabric to the underlying soil, while inhibiting the upward growth of plants germinated below the fabric by both preventing the penetration of shoots through the fabric and inhibiting penetration of light to such shoots. The base fabric is preferably provided with vegetable seeds in a pattern designed to maximize vegetable growth and density. Slow release fertilizers may also be emplaced on the base fabric to assist growth of the seeds. The fertilizer may be applied either as a uniform coating over the base fabric, or in a discrete pattern or grid over the base fabric.

The hydrating medium is laminated to the base medium with an organic tackifier, and preferably comprises a quantity of sterile biomass capable of absorbing and retaining moisture. A biodegradable cover medium, or veil, is applied over the hydrating medium, and is easily permeable both to water (from above) and the codelescent shoots of the vegetables (from below). The entire apparatus may be secured in place with securing strips or wings as extensions of the cover medium, and a tunnel cover may be erected to protect the vegetables from early-season frost or from ambient contamination by unwanted seeds or spores.

The apparatus of the present invention may be manufactured and prepackaged for sale as a "transportable garden", and may be sold in any convenient manner, such as by lineal feet, square feet, etc.

In its broadest embodiment, the present invention comprises:

a. a sterile base fabric capable of permitting the roots of plants and water above said fabric to penetrate downwardly through the fabric while preventing the upward penetration of plants from below the fabric, and having an extension from each side thereof to extend beneath the ground surface on each side of the mat to secure the mat to the ground;

b. a plurality of plant seeds disposed upon an upper surface of the base fabric and secured to the fabric with a biodegradable, water soluble organic adhesive;

c. a predetermined quantity of fertilizer applied either in discrete units to the base fabric or broadcast uniformly across the base fabric;

d. a layer of sterilized hydrophilic biodegradable hydrating medium applied to the base fabric with a biodegradable water soluble organic adhesive, and e. a cover medium to cover the hydrating medium.

DETAILED DESCRIPTION OF THE INVENTION

Figure 1:
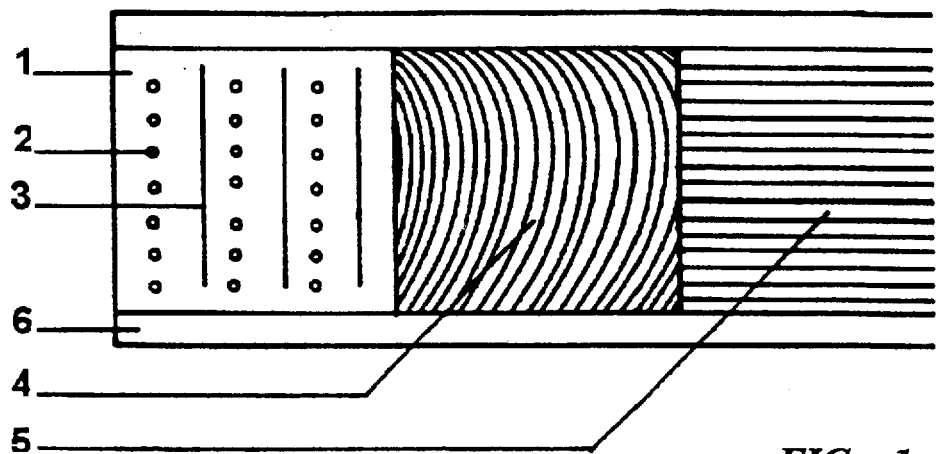
FIG. 1 is a plan view of the apparatus of the present invention with adjacent layers partially removed to reveal the next-lower layer.

Illustrated in FIG. 1, the apparatus of the present invention comprises a laminated mat structure especially adapted to grow food vegetables, herbs, mushrooms or other vegetable matter. The apparatus includes a base fabric medium 1, a plurality of seeds or spores 2, and fertilizer 3. The seeds 2 are overlain with a hydrating medium 4, which is in turn enclosed in a cover medium, or veil, 5. The base fabric medium 1 may be provided with securing strips or wings 6 which are adapted to extend below grade. The seeds 2 are retained on the base fabric with any convenient biodegradable organic adhesive, that is preferably water soluble so as to not adversely impact germination of the seed. It is to be understood that as used hereinafter, the term "seed" shall encompass all conventional means of starting new plants, including spores, asexually reproduced vegetative cuttings, etc.

Figure 3:
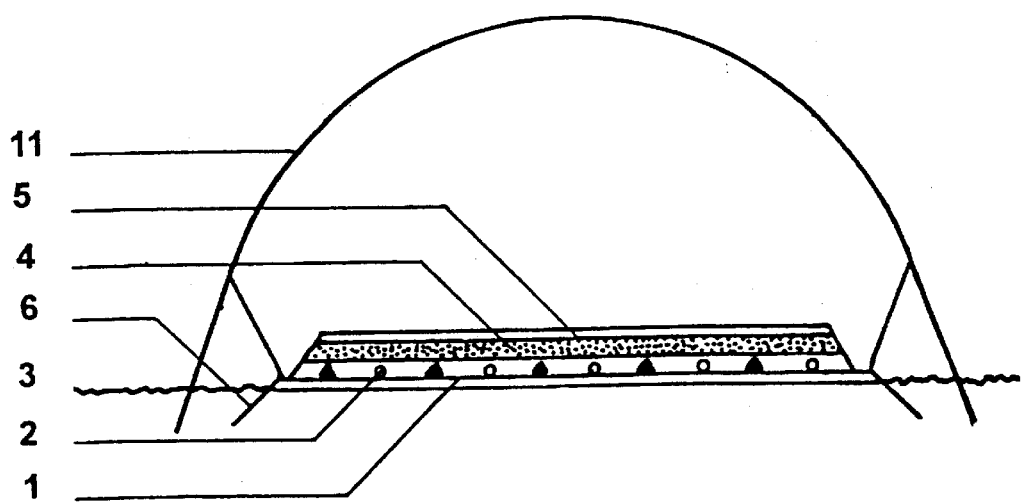
FIG. 3 is a sectional view of a representative apparatus of the present invention.

FIG. 3 illustrates in greater detail the construction of the present invention. The base fabric medium 1 is a slowly biodegradable, water permeable membrane. For example, applicant has found that a number of organically-coated paper membranes will function in the invention to permit penetration of water and roots from above while inhibiting the upward penetration of shoots of plants germinating from below. Seeds 2 may be adhered in a defined pattern to the base fabric, or may be distributed randomly across the upper surface of fabric 1. Seeds are preferably adhered to the base fabric with an organic water based adhesive having a high tack factor and quick drying time. The adhesive may be applied in defined or random spots for adhesion of seeds to the base fabric, and subsequently adhesion of the hydrating medium to the base fabric in discrete spots, or the adhesive may be uniformly applied so as to adhere the hydrating medium to the base fabric broadly.

In any event, the hydrating medium 4 is adhesively applied to the base fabric, with seeds thereon, either as a pre-formed mat, or assembled as a mat on the base fabric. The hydrating mat comprises a mass of hydrophilic fibers, for example wood pulp fibers, that are adhesively adhered to one another to form a discrete mat. Alternatively, peat moss, potato wastes, aged manure, wheat straw, grass clippings, wood chips, composted vegetable matter, dried gel particles, dried fish emulsion or any other acceptable medium, may be used. The fibers must be capable of absorbing and retaining water for a period of time sufficient to induce germination of the underlying seeds. Preferably, this medium is sterilized prior to incorporation into the apparatus of the present invention so as to incapacitate seeds or vegetative matter from potential weeds or unwanted plants within this medium. A functional hydrating medium is peat moss having individual fibers of from 1–2 cm in length, mixed with dried fish emulsion in a ratio of about 1 oz. of fish emulsion per $ft^3$ of peat moss. Finely ground and dried potato waste is mixed in a ratio of about 1 oz per $ft^3$ of peat moss.

After the hydrating medium is prepared, it is applied to the base fabric over the seeds with a water soluble adhesive applied either to the underside of the hydrating medium or to the upper surface of the base fabric.

The seeds may be applied in a pattern designed to produce optimum density and growth of the particular species, or they may be randomly distributed over the surface of the base fabric (as, in the case of ornamental flowers). Untreated seeds may be applied with no coating thereon, or treated seeds may be provided with, for example, a pelletized coating of clay, as provided by the Osborn International Seed Co. of Mount Vernon, Wash.

The base fabric may be any appropriate water soluble medium with sufficient integrity to withstand the manufacture, packaging, shipping and installation of the present invention. The base may be, for example, a 40–50 pound (per 1000 $ft^2$) wood fiber sheet having water soluble binders therein such that the sheet is quickly biodegradable.

The veil 5 is constructed of a material with sufficient structural integrity to protect the underlying hydrating medium from wind or water erosion, while permitting penetration of water and the shoots of germinating plants from seeds 2. The veil 5 may be provided in a dark color so as to retain heat adjacent seeds to aid in early-season germination. The base fabric 1 is preferably provided with securing strips or wings 6 on either side of the fabric 1. When buried beneath the soil grade level 10, the wings 6 secure the device in place against movement by wind or water. The device may be covered with a tunnel mechanism 11 to protect the seeds and newly germinated plants from early-season frost.

Figure 2:
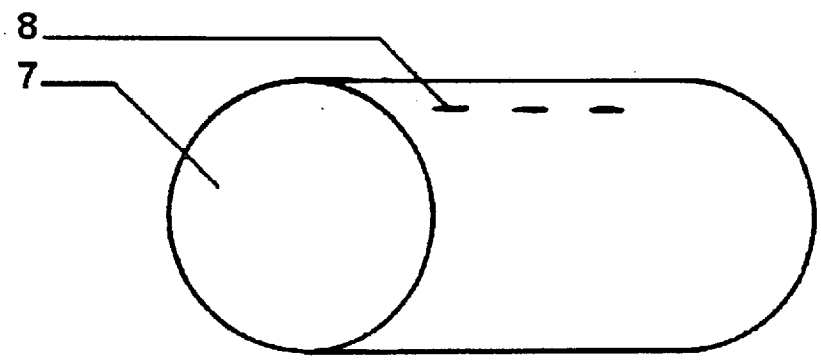
FIG. 2 is a schematic representation of the present invention packaged for commercial sale.
Figure 4:
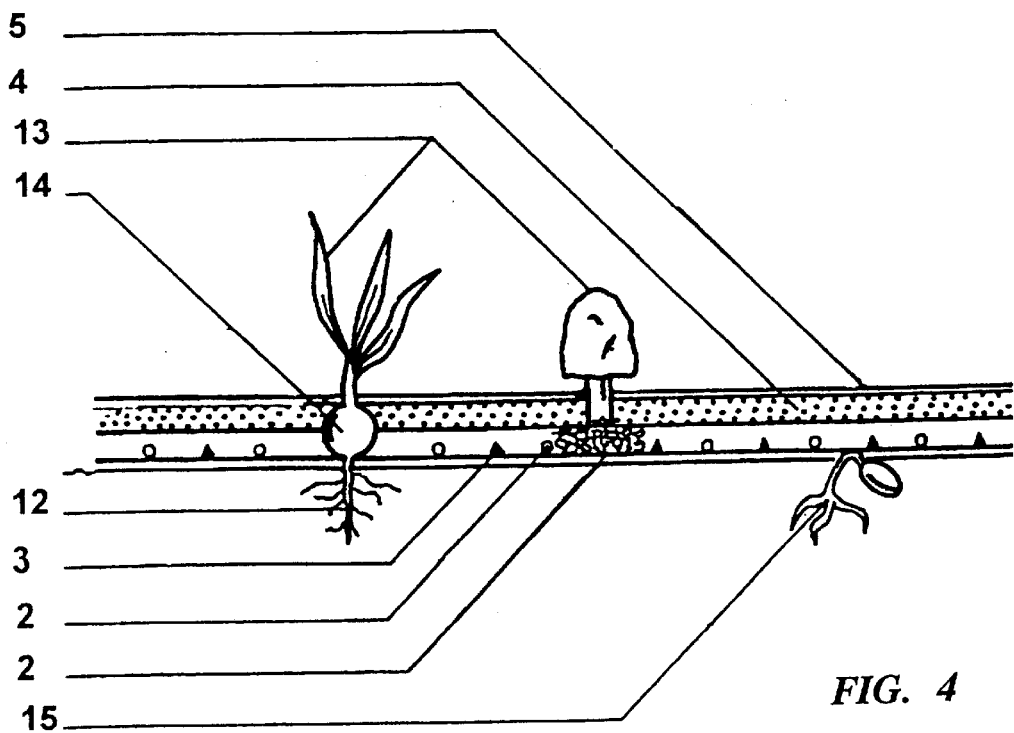
FIG. 4 is an enlarged sectional view of the apparatus of FIG. 1, illustrating the growth of vegetable matter.

The apparatus of the present invention may be sold in an unrolled condition (FIG. 1) or longer units of the device may be rolled as is grass sod (FIG. 2), enclosed in a plastic sheath 7, sold for subsequent hydration. As illustrated in FIG. 4, after sufficient time for the seeds 2 to germinate, the roots 12 and shoots 13 of new plants (or fungi) are, relatively, quite aggressive and capable of penetrating the base fabric 1 and veil 5 respectively. Conversely, shoots 15 of plants germinating below the device are relatively less aggressive and are incapable of penetrating the base fabric 1. Small perforations in the base fabric may provide the opportunity for tap roots to penetrate while being sufficiently small to prevent penetration by codelescent leaves of shoots.

All or portions of the present invention may be sterilized by any conventional means, such as by heat or steam, chemical sterilization, or sterilization with an appropriate radionuclide. Of course, sterilization of the seeds must be avoided if deleterious effects on seed germination will be effected thereby.

EXAMPLE 1

A prototype of the present invention was constructed. Over freshly tilled (non-sterilized) soil, a sheet of Weed Shield Landscape Fabric manufactured by EGI measuring 3'×5' was laid and covered ½" deep with sterilized peat moss. Radish seeds were broadcast on top of the peat moss and watered with filtered water twice daily. Germination occurred between 3 and 4 days, and 25 days later radishes were harvested with good symmetry and root growth, with very little weed contamination.

EXAMPLE 2

Freshly tilled soil was covered with a 3'×5' piece of the fabric of Example 1 and covered with ¾" to 1" of loose peat moss. Carrot and colander seeds were seeded in rows on the base fabric beneath the peat moss. The peat moss was then sprayed with a thick liquid mix of fish, emulsions and water, and thereafter watered twice daily with filtered water. Carrots were harvested beneath the base fabric in underlying soil.

EXAMPLE 3

Freshly tilled soil was covered with a 4'×40' sheet of Remax/Typar fabric, and covered with 2" of peat moss. Basil was seeded in 2" rows beneath the peat moss on the base fabric and sprayed with a fish fertilizer. It was anticipated that roots would be unable to penetrate the base sheet, which in fact occurred. The basil was harvested by removing a root mat, which was transplanted into a water tray prior to replanting.

EXAMPLE 4

A 12"×14" piece of standard writing paper was placed in a tray and seeded with radish seeds applied individually by hand and adhered with an organic glue. The seeds were covered approximately 1" deep with peat moss, which was covered with bathroom tissue. 39 of 40 radishes germinated.

EXAMPLE 5

Over freshly tilled soil, a 3'×3' sheet of poster paper was covered in a 2" grid with radish seeds adhered with an organic adhesive, and sprayed with fish fertilizer. 1–2" of peat moss was applied and sprayed with potato fertilizer. Essentially all seeds germinated and were harvested weed free.

Applicant has disclosed preferred and alternative embodiments of the invention. From the foregoing it is clear that the present invention provides an effective means of growing vegetables in a prepared mat. While the invention has been described with reference to these specific embodiments, it is not intended to be so limited thereby, except as specifically set forth in the claims appended hereto.

I claim:

1. A prepared mat for growing vegetables and the like in a predetermined manner, comprising:
   a. a sterile base fabric capable of permitting the roots of plants and water above said fabric to penetrate downwardly through the fabric while preventing the upward penetration of plants from below the fabric;
   b. a plurality of plant seeds disposed upon an upper surface of the base fabric and secured thereto with a biodegradable, water soluble organic adhesive;
   c. a predetermined quantity of fertilizer applied to the base fabric adjacent to the plant seeds;
   d. a layer of sterilized hydrophilic biodegradable hydrating medium applied to said base fabric above the seeds with a biodegradable, water soluble organic adhesive; and
   e. a cover medium to cover the hydrating medium.

2. A prepared mat for growing vegetables and the like in a predetermined manner, comprising:
   a. a sterile base fabric capable of permitting the roots of plants and water above said fabric to penetrate downwardly through the fabric while preventing the upward penetration of plants from below the fabric, and having an extension from each side thereof to extend beneath the ground surface on each side of the mat to secure the mat to the ground surface;
   b. a plurality of plant seeds and fertilizer units uniformly disposed upon an upper surface of the base fabric and secured thereto with a biodegradable, water soluble organic adhesive;
   c. a layer of sterilized hydrophilic biodegradable hydrating medium applied to said base fabric above the seeds with a biodegradable, water soluble organic adhesive; and
   d. a cover medium to cover the hydrating medium.

3. The mat of claim 2, wherein the seeds are prepared by pelletizing the seeds with a clay coating.

4. The mat of claim 2, wherein the hydrating medium is selected from the group consisting essentially of peat moss, aged manure, wheat straw, grass clippings, wood chips, composted vegetable matter, and dried gel particles.

* * * * *